US 7,099,342 B2

(12) United States Patent
Lee

(10) Patent No.: US 7,099,342 B2
(45) Date of Patent: Aug. 29, 2006

(54) FSM FOR A BCC BETWEEN A V5.2 INTERFACE AND AN ATM INTERFACE AND THE OPERATING METHOD THEREOF

(75) Inventor: Kang Hoon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 995 days.

(21) Appl. No.: 10/154,818

(22) Filed: May 28, 2002

(65) Prior Publication Data

US 2003/0086430 A1    May 8, 2003

(30) Foreign Application Priority Data

Nov. 5, 2001    (KR) ............................... 2001-68547

(51) Int. Cl.
 *H04L 12/28* (2006.01)
(52) U.S. Cl. .................................... 370/401; 370/395.1
(58) Field of Classification Search ........ 370/352–358, 370/359–360, 373, 377, 384, 386, 389, 401, 370/395.1, 395.2, 395.21, 395.6, 395.61, 370/402
See application file for complete search history.

(56) References Cited

U.S. PATENT DOCUMENTS

| 6,335,929 | B1 * | 1/2002 | Haster ........................ 370/352 |
| 6,411,630 | B1 * | 6/2002 | Lallukka et al. ............ 370/458 |
| 6,711,175 | B1 * | 3/2004 | Rautiainen et al. ......... 370/458 |
| 2004/0037273 | A1 * | 2/2004 | Lobig ........................ 370/356 |

* cited by examiner

*Primary Examiner*—Brenda Pham
(74) *Attorney, Agent, or Firm*—Fleshner & Kim, LLP

(57) ABSTRACT

A Finite State Machine (FSM) for a Bearer Channel Connection (BCC) between a V5.2 interface and an Asynchronous Transfer Mode (ATM) interface is disclosed, including a V5.2 Interface Control Process FSM (TAM) that connects and releases a V5.2 bearer channel by controlling the V5.2 interface between a Local Exchange (LE) and a gateway; and an ATM Interface Control Process FSM (RAM) that connects and releases an ATM bearer channel by controlling the ATM interface between the gateway and an access gateway.

23 Claims, 5 Drawing Sheets

Fig.3

| Status \ Event | BCC0(NULL) | BCC1(Wait AtmEstRP) | BCC2(Conversation) | BCC3(Wait AtmReIRP) |
|---|---|---|---|---|
| Allocation | SEND AtmEstRQ TO A2CC START TA2Est SET BCC1 | / | / | / |
| AtmEstRP(Ret) | SEND V52FaiIRP TO A2CC | Case Of Ret — pd_V5BccConnRq OK: Stop TA2Est SEND Allocation Comp TO LE / NOK: Stop TA2Est SEND Allocation Reject TO LE SEND V52FaiIRP TO A2CC SET BCC0 | / | / |
| DeAllocation | SEND DeAllocation Comp TO LE | STOP TA2Est SEND V52FaiIRP TO A2CC SEND DeAllocation Comp TO LE SET BCC0 | SEND AtmReIRQ TO A2CC START TA2Rel SET BCC3 | / |
| AtmReIRP | / | / | / | Case OF Pd_V5BccRelRq — OK: STOP TA2Rel SEND DeAllocation Comp TO LE SET BCC0 / NOK: STOP TA2Rel SEND DeAllocation Reject TO LE SET BCC0 |
| TA2Est Timer Expire | / | SEND V52FaiIRP TO A2CC SEND Allocation Reject TO LE SET BCC0 | / | / |
| TA2Rel Timer Expire | / | / | / | Case OF Pd_V5BccRelRq — OK: SEND DeAllocation Comp TO LE SEND V52FaiIRP TO A2CC SET BCC0 / NOK: SEND DeAllocation Reject TO LE SEND V52FaiIRP TO A2CC SET BCC0 |

Fig.4

| Status / Event | IDLE | O_BUSY | O_SUSPEND | T_BUSY | T_SUSPEND |
|---|---|---|---|---|---|
| Hook Off | O_BUSY | / | O_BUSY | / | T_BUSY |
| Hook On | SEND CidAllocRQ TO Opposite A2CC T_BUSY | O_SUSPEND | / | T_SUSPEND | / |
| AtmEstRQ | | Ret=pd_AtmRsrcConnRQ SEND AtmEstRP(Ret) TO VPC | SEND AtmEstRP(NOK) TO VPC | SEND AtmEstRP(OK) TO VPC | SEND AtmEstRP(NOK) TO VPC |
| CidAllocRP(Ret) | / | Case Of Ret=NOK SEND AtmEstRP(NOK) TO VPC | Case Of Ret=NOK SEND AtmEstRP(NOK) TO VPC | Case Of Ret=NOK SEND AtmEstRP(NOK) TO VPC / Case Of Ret=OK Ret=Pd_AtmRsrcConnRQ AtmEstRP(Ret) TO VPC | Case Of Ret=NOK SEND AtmEstRP(NOK) TO VPC |
| AtmRelRQ | SEND AtmRelRP TO VPC | Pd_AtmRsrcRelRQ SEND CidDeAllocRQ TO Opposite A2CC | Pd_AtmRsrcRelRQ SEND CidDeAllocRQ TO Opposite A2CC | Pd_AtmRsrcRelRQ SEND CidDeAllocRQ TO Opposite A2CC | Pd_AtmRsrcRelRQ SEND CidDeAllocRQ TO Opposite A2CC |
| CidDeAllocRP | / | SEND AtmRelRP TO VPC IDLE | SEND AtmRelRP TO VPC IDLE | SEND AtmRelRP TO VPC IDLE | SEND AtmRelRP TO VPC IDLE |
| V52FailRP | / | Pd_AtmRsrcRelRQ SEND CidDeAllocRQ TO Opposite A2CC O_SUSPEND | Pd_AtmRsrcRelRQ SEND CidDeAllocRQ TO Opposite A2CC | Pd_AtmRsrcRelRQ SEND CidDeAllocRQ TO Opposite A2CC | Pd_AtmRsrcRelRQ SEND CidDeAllocRQ TO Opposite A2CC |

Fig.5
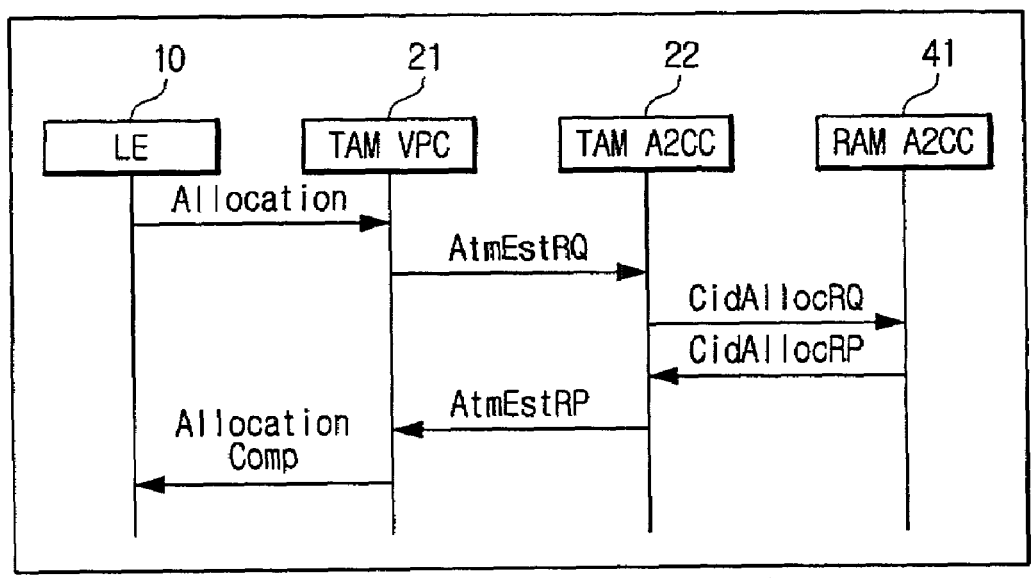
Bearer Channel Connection Procedure
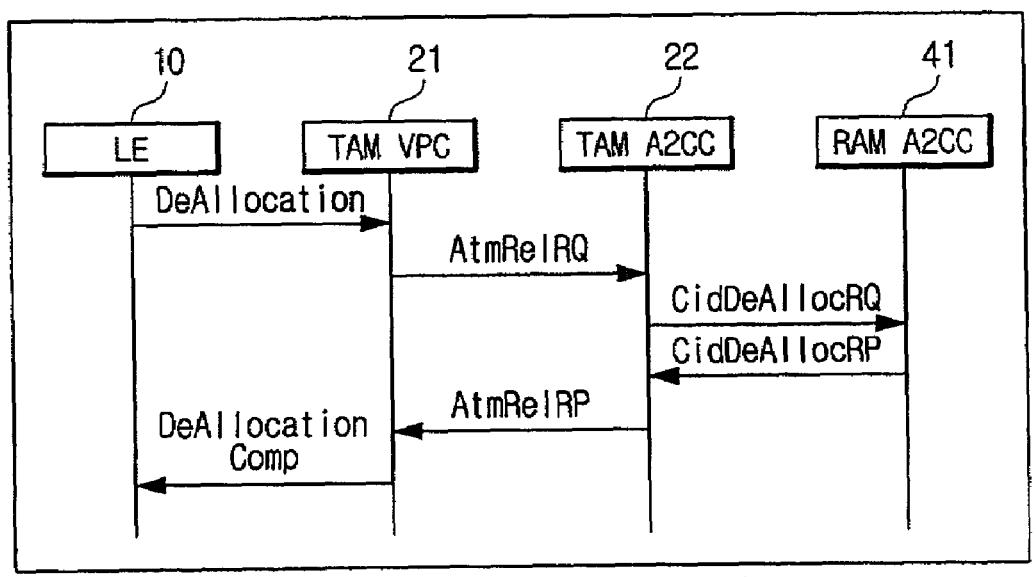
Bearer Channel Release Procedure

FSM FOR A BCC BETWEEN A V5.2 INTERFACE AND AN ATM INTERFACE AND THE OPERATING METHOD THEREOF

BACKGROUND OF THE INVENTION

1. Field of the Invention

The present invention relates to an Finite State Machine (FSM) for a Bearer Channel Connection (BCC) between a V5.2 interface and an Asynchronous Transfer Mode (ATM) interface and, more particularly, to establishing a bearer channel between a gateway inter-operating with a Local Exchange (LE), through the V5.2 interface, and another gateway inter-operating with an ATM network.

2. Background of the Related Art

A local loop in a Public Switched Telephone Network (PSTN) ordinarily means a subscriber circuit, which is a line connecting a telephone subscriber's terminal equipment and an exchange. Recently, local loop technology has diversified to applications using coaxial cable and optical cable networks, which are primarily used for cable television. As wireless connection technology develops, so too does the wireless technology of the local loop.

Thus, an Access Network (AN) supporting both wireless network services and the wire exchange network has been developed. As a result, the AN may provide wireless network services in addition to the conventional services of the wire exchange network, such as voice, facsimile, Integrated Services Digital Network (ISDN), circuit data, etc.

FIG. 1 illustrates the structure of a system of the related art providing both wire network services and wireless network services. As shown in FIG. 1, the system comprises a PSTN (11), multiple LEs (12-1, 12-2), an AN (13), and multiple base stations (14-1~14-n). Here, each LE (12-1, 12-2) provides wire network services through the PSTN (11). AN (13) provides the wireless network services through the relevant base stations (14-1~14-n). LE (12-2) and AN (13) inter-operate with each other by a V5.2 interface.

The V5.2 interface provides various services (i.e., the wire network services and the wireless network services) between LE (12-2) and AN (13). It provides bearer channels, ISDN D-channel information, PSTN signaling information, control information, link control information, protection information, BCC, and timing, etc.

The bearer channel is a user information channel established for bi-directional transmission of B-channel information, at the ISDN user port, and A-law Pulse Code Modulation (PCM) coded 64 Kbit/s channel information at the PSTN user port. The ISDN D-channel information is D-channel information (Ds-, p-, f-type data) of the ISDN user port and is data link layer signal information that is transmitted bi-directionally. The PSTN signaling information is signaling information of the PSTN user port that is transmitted bi-directionally. Control information is user port control information concerning the user port's state or control, which is transmitted bi-directionally, and general function control information supporting the synchronized application of provisioning data or the restart function. Link control information is the link control protocol providing the 2,048 Kbit/s link control that processes the frame allocation, multi-frame allocation, warning display, and Cyclic Redundancy Check (CRC) information, as well as manages the function of 2,048 Kbit/s links at the V5.2 interface. The protection information provides the logical C-channel's switching between physical C-channels. The BCC provides the bearer channel allocation and line concentration functions under the control of LE (12-2). The timing is used to provide the timing information for bit transmission, octet recognition, and frame synchronization and to synchronize LE (12-2) and AN (13).

So as to establish the bearer channel between LE (12-2) and AN (13), which inter-operate through the V5.2 interface, FSMs have been implemented by applying recommendations such as ETS 300 324-1.

Current ATM networks may efficiently transmit all types of data, such as voice, image, file, etc. The ATM network provides simple data transmission and various functions relating to the network operation or Operation Administration and Maintenance (OAM). Moreover, the ATM network has other advantages. It supports wide bandwidth, short transmission delay, and may support the requisite Quality of Service (QOS). Therefore, the ATM network is spreading rapidly. Most networks adopt the ATM as their transmission method.

Accordingly, it became necessary for the V5.2 interface, which had been established as a general standard, to inter-operate with the ATM network, so as to connect the LE and the AN.

In other words, due to the rapidly spreading use of the ATM network these days, an FSM for establishing the BCC through the signaling between the V5.2 interface and the ATM interface is required. Such FSM should be able to prevent the inconsistency among the LE's bearer resources, resources managed at the V5.2 interface, and resources managed within the ATM area. Furthermore, the FSM must be able to optimize the inter-operability of the ATM network and the V5.2 interface by standardizing the methods to process problems that occur during its operation.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an FSM and the operating method thereof for establishing a bearer channel in the area between a V5.2 interface and an ATM interface.

It is another object of the present invention to provide an FSM and the operating method thereof for a BCC between a gateway inter-operating with the LE, through the V5.2 interface, and another gateway (i.e., access gateway) operated through the ATM network.

It is a further object of the present invention to enable interfacing between the V5.2 BCC protocol and AAL2 and AAL5 signaling of the ATM area.

It is a further object of the present invention to prevent the waste of resources by establishing a stable circuit connection and release, for inter-operation with the LE, that is processed in real time.

It is a further object of the present invention to reduce the performance degradation that may occur, depending on the resource establishment at the call connection and release steps.

It is a further object of the present invention to resolve the basic problems caused by a failure to recover resources, owing to the state inconsistency occurring in the interfacing of different interfaces, by implementing an FSM for a BCC between the V5.2 interface and the ATM interface.

In order to achieve the above objects, the present invention provides a Finite State Machine (FSM) for a Bearer Channel Connection (BCC) between a V5.2 interface and an Asynchronous Transfer Mode (ATM) interface, including a V5.2 Interface Control Process FSM (TAM) for connecting and releasing a V5.2 bearer channel, by controlling the V5.2 interface between a Local Exchange (LE) and a gateway; and an ATM Interface Control Process FSM (RAM) for connecting and releasing an ATM bearer channel, by controlling the ATM interface between the gateway and an access gateway.

Preferably, the TAM includes a TAM V5.2 Protocol Control (VPC) for transmitting an ATM BCC request message or an ATM BCC release request message, according to an allocation message or a release message received from the LE, or transmitting an error message, if there is no response to a transmitted message within a pre-specified time or if there is any system error; executing V5.2 BCC procedures upon receiving an ATM BCC response message; and executing V5.2 BCC release procedures upon receiving an ATM BCC release response message. Additionally, the TAM includes a TAM AAL2 Call Control (A2CC) for transmitting a bearer channel allocation request message to the RAM, according to the ATM BCC request message received from the TAM VPC; executing ATM resource release procedures, according to the ATM BCC release request message or the error message received from the TAM VPC, and then transmitting a bearer channel release request message to the RAM; executing ATM resource connection procedures, according to a bearer channel allocation response message received from the RAM, and then transmitting the ATM BCC response message to the TAM VPC; and transmitting the ATM BCC release response message to the TAM VPC, according to a bearer channel release response message received from the RAM.

Preferably, the RAM includes a RAM A2CC for establishing the ATM area's BCC, according to the bearer channel allocation request message received from the TAM, and then transmitting a bearer channel allocation response message to the TAM. Also, the RAM A2CC executes the ATM area's BCC release, according to the bearer channel release request message received from the TAM, and then transmits a bearer channel release response message to the TAM.

Alternatively, a Finite State Machine (FSM) for a Bearer Channel Connection (BCC) between a V5.2 interface and an Asynchronous Transfer Mode (ATM) interface, according to a preferred embodiment of the present invention, includes a V5.2 Interface Control Process FSM (TAM) V5.2 Protocol Control (VPC) for transmitting an ATM BCC request message or an ATM BCC release request message, according to an allocation message or a release message received from a Local Exchange (LE), or transmitting an error message, if there is no response to a transmitted message within a pre-specified time or if there is any system error; executing V5.2 BCC procedures upon receiving an ATM BCC response message; and executing V5.2 BCC release procedures upon receiving an ATM BCC release response message. Also, the TAM VPC includes a TAM AAL2 Call Control (A2CC) for transmitting a bearer channel allocation request message, according to the ATM BCC request message received from the TAM VPC; executing ATM resource release procedures, according to the ATM BCC release request message or the error message received from the TAM VPC, and then transmitting a bearer channel release request message; executing ATM resource connection procedures upon receiving a bearer channel allocation response message and then transmitting the ATM BCC response message to the TAM VPC, and transmitting the ATM BCC release response message to the TAM VPC upon receiving a bearer channel release response message. Additionally, the TAM VPC includes an ATM Interface Control Process FSM (RAM) A2CC for establishing the ATM area's BCC, according to the bearer channel allocation request message received from the TAM A2CC, and then transmitting a bearer channel allocation response message to the TAM A2CC. The RAM A2CC also executes the ATM area's BCC release, according to the bearer channel release request message received from the TAM A2CC, and then transmits a bearer channel release response message to the TAM A2CC.

So as to achieve one or more of the above-mentioned objects of the present invention, a Finite State Machine (FSM) operating method for Bearer Channel Connection (BCC) between a V5.2 interface and an Asynchronous Transfer Mode (ATM) interface, according to a preferred embodiment of a present invention, includes allocating a bearer channel between the V5.2 interface and the ATM interface, according to states of a V5.2 Interface Control Process FSM (TAM) and an ATM Interface Control Process FSM (RAM); and releasing the bearer channel connected between the V5.2 interface and the ATM interface, according to the states of the TAM and the RAM.

Preferably, allocating the bearer channel includes generating an ATM BCC request message, upon receiving an allocation message from a Local Exchange (LE), and driving a timer at the same time, and then making a transition of the system state to an ATM BCC response message receipt waiting state, in a V5.2 Protocol Control (VPC) of the TAM; confirming a subscriber's current state, upon receiving the ATM BCC request message, and then generating a bearer channel allocation request message and making a transition of the current subscriber state to a terminating busy state at the same time, in an AAL2 Call Control (A2CC) of the TAM; executing the ATM area's BCC, upon receiving the bearer channel allocation request message, and then generating a bearer channel allocation response message in an A2CC of the RAM; confirming the subscriber's current state, upon receiving the bearer channel allocation response message, and then executing ATM resource connection procedures and generating an ATM BCC response message, according to a result value of the bearer channel allocation response message in the AAL2 of the TAM; and confirming the result value upon receiving the ATM BCC response message and, thereafter, stopping the timer, executing V5.2 bearer channel connection procedures, and transmitting an allocation complete message to the LE, at the same time, in the VPC of the TAM.

Preferably, allocating the bearer channel further includes executing the ATM resource connection procedures and then generating the ATM BCC response message, and transmitting the ATM BCC response message to the VPC of the TAM, if the A2CC of the TAM receives the ATM BCC request message while the subscriber's state is in an originating busy state.

Preferably, allocating the bearer channel further includes setting the result value of the ATM BCC response message with 'NOK' and transmitting it to the VPC of the TAM, if the A2CC of the TAM receives the ATM BCC request message while the subscriber's state is in an originating suspend state or a terminating suspend state.

Preferably, allocating the bearer channel further includes setting the result value of the ATM BCC response message with 'OK' and transmitting it to the VPC of the TAM, if the A2CC of the TAM receives the ATM BCC request message while the subscriber's state is a terminating busy state.

Preferably, allocating the bearer channel further includes setting the result value of the ATM BCC response message with 'NOK' and transmitting it to the VPC of the TAM, if the A2CC of the TAM receives the bearer channel allocation response message while the subscriber's state is the originating busy state, the originating suspend state, or the terminating suspend state.

Preferably, allocating the bearer channel further includes transmitting an error message to the A2CC of the TAM and transmitting the allocation-reject message to the LE, at the same time, and then making a transition of the system state to the initial state in the VPC of the TAM, if the timer expires during the ATM BCC response message receipt waiting state.

Preferably, allocating the bearer channel further includes stopping the timer and generating an allocation-reject message, at the same time, in the VPC of the TAM, if the result value of the ATM BCC response message is 'NOK' or if the execution result of the V5.2 bearer channel connection procedures is 'NOK'.

Preferably, allocating the bearer channel further includes generating an error message and transmitting it to the A2CC of the TAM, if the VPC of the TAM receives the ATM BCC response message in the initial system state.

Preferably, releasing the bearer channel includes receiving a release message from the LE, confirming the system state and, thereafter, generating an ATM BCC release request message and driving the timer at the same time, and making a transition of the system state to an ATM BCC release response message receipt waiting state in the VPC of the TAM; receiving the ATM BCC release request message, confirming the subscriber's current state and, thereafter, executing ATM resource release procedures, and generating a bearer channel release request message in the A2CC of the TAM; receiving the bearer channel release request message, executing the bearer channel release of the ATM area and, thereafter, generating a bearer channel release response message in the A2CC of the RAM; receiving the bearer channel release response message, and then generating an ATM BCC release response message and making a transition of the subscriber's state to the idle state, at the same time, in the A2CC of the TAM; and receiving the ATM BCC release response message and then executing V5.2 bearer channel release procedures and, thereafter, stopping the timer operation and transmitting a release-complete message to the LE, at the same time, and making a transition of the system state to the initial state in the VPC of the TAM.

Preferably, releasing the bearer channel further includes transmitting the release-complete message to the LE, if the VPC of the TAM receives the release message in the initial system state.

Preferably, releasing the bearer channel further includes stopping the timer operation, transmitting an error message to the A2CC of the TAM and transmitting a release-complete message to the LE, at the same time, and, thereafter, making a transition of the system state to the initial state, if the VPC of the TAM receives the release message during the ATM BCC response message receipt waiting state.

Preferably, releasing the bearer channel further includes transmitting an ATM BCC release response message to the VPC of the TAM, if the A2CC of the TAM receives the ATM BCC release request message while the subscriber's state is the idle state.

Preferably, releasing the bearer channel further includes stopping the timer's operation and transmitting a release-reject message to the LE, at the same time, and, thereafter, making a transition of the system state to the initial state in the VPC of the TAM, if the execution result of the V5.2 bearer channel release procedures is 'NOK'.

Preferably, releasing the bearer channel further includes executing the V5.2 bearer channel release procedures and, thereafter, transmitting a release-complete message to the LE and transmitting an error message to the A2CC of the TAM, at the same time, and then making a transition of the system state to the initial state in the VPC of the TAM, if the timer expires during the ATM BCC release response message receipt waiting state.

Preferably, releasing the bearer channel further includes transmitting a release-reject message to the LE and transmitting an error message to the A2CC of the TAM, at the same time, and making a transition of the system state to the initial state in the VPC of the TAM, if the execution result of the V5.2 bearer channel release procedures is 'NOK'.

BRIEF DESCRIPTION OF THE DRAWINGS

The invention will be described in detail with reference to the following drawings in which like reference numerals refer to like elements wherein:

FIG. 3 illustrates a table of states for the TAM illustrated in FIG. 2;

FIG. 4 illustrates a table of states for the RAM illustrated in FIG. 2; and

FIG. 5 illustrates a flowchart of the FSM operating method, for the BCC between the V5.2 interface and the ATM interface, according to a preferred embodiment of the present invention.

DETAILED DESCRIPTION OF PREFERRED EMBODIMENTS

Figure 1:
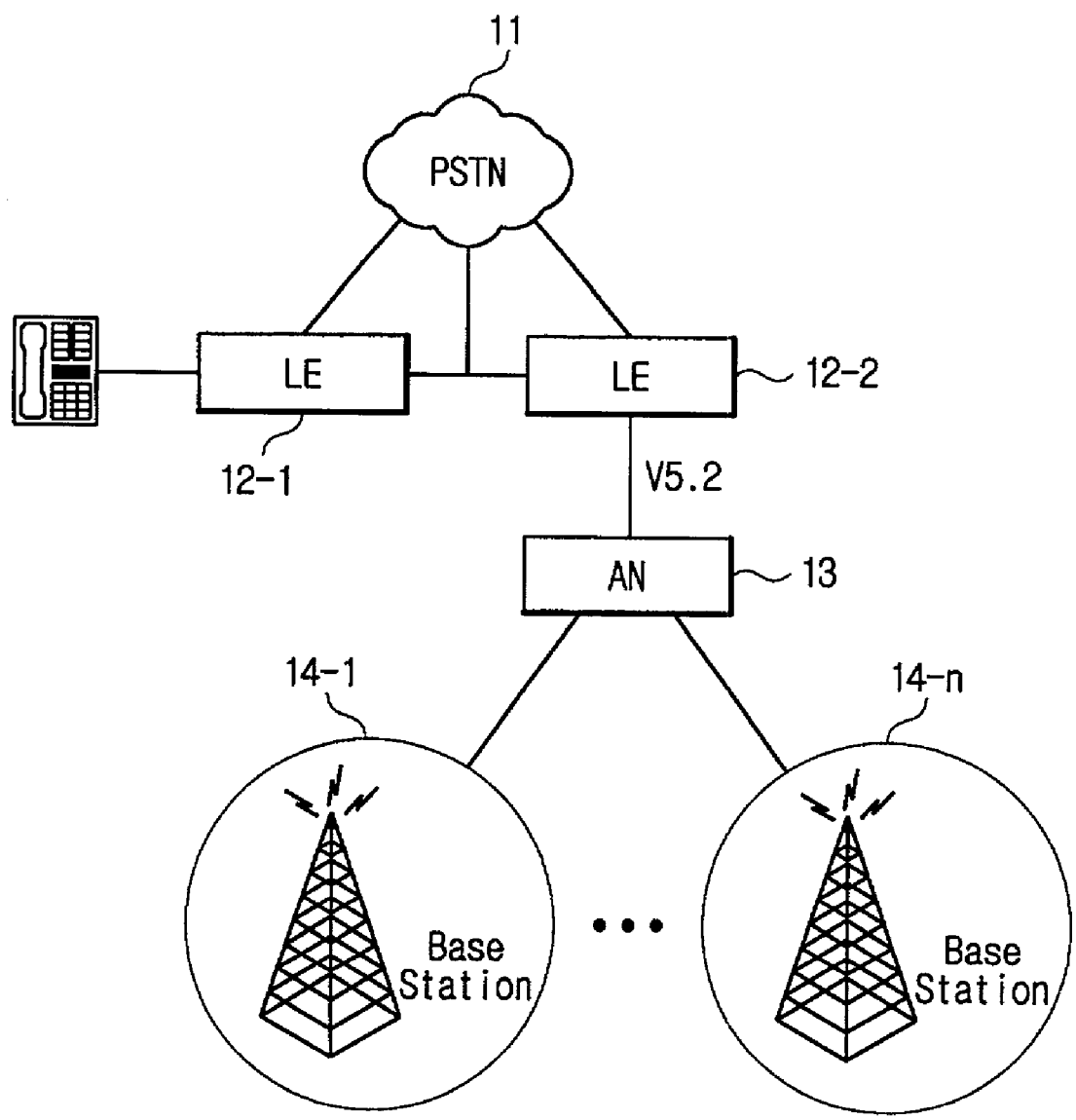
FIG. 1 illustrates the structure of a related art system providing both wire network services and wireless network services.
Figure 2:
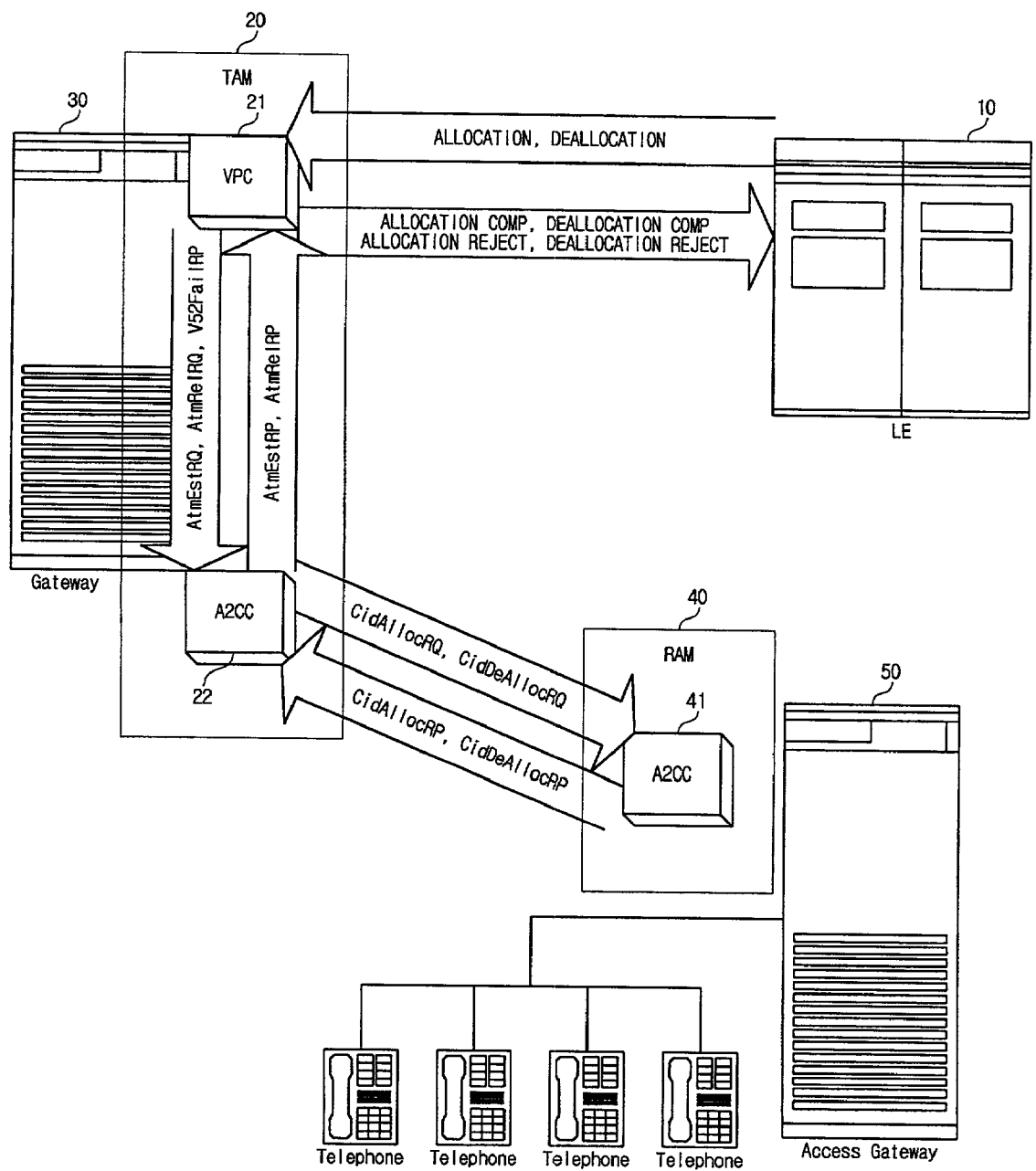
FIG. 2 illustrates the structure of an FSM, for a BCC between a V5.2 interface and an ATM interface, according to a preferred embodiment of the present invention.

The Finite State Machine (FSM) for the Bearer Channel Connection (BCC) between the V5.2 interface and the Asynchronous Transfer Mode (ATM) interface, according to a preferred embodiment of the present invention, requires separate processes for controlling the V5.2 interface part and the ATM interface part, respectively. Preferably, as shown in FIG. 2, the FSM includes a V5.2 interface control process FSM (TAM) (20) and an ATM interface control process FSM (RAM) (40).

TAM (20), which includes a V5.2 Protocol Control (VPC) (21) and an AAL2 Call Control (A2CC) (22), connects and releases a V5.2 bearer channel by controlling the V5.2 interface between a Local Exchange (LE) (10) and a gateway (30). The state table of TAM (20) is shown in FIG. 3.

RAM (40), which includes an A2CC (41), connects and releases an ATM bearer channel by controlling the ATM interface between gateway (30) and an access gateway (50). The state table of RAM (40) is shown in FIG. 4.

In the state tables, '/' means that no action is executed. 'START' means the start of the timer operation and 'STOP' means the stop of the timer. 'SEND' means the signal transmission. 'Case Of' means the process will be branched to 'OK' or 'NOK,' depending on the return result. 'SET' means the state change.

Gateway (30) is inter-operated with LE (10) through the V5.2 interface. Access gateway (50) is inter-operated with gateway (30) through the ATM interface.

LE (10) generates an allocation message (Allocation), which is a V5.2 BCC protocol message requesting the BCC, or a release message (DeAllocation), which is a V5.2 BCC protocol message requesting the bearer channel release, and transmits the message to TAM VPC (21).

When TAM VPC (21) receives the allocation message (Allocation) from LE (10), it generates an ATM BCC request message (AtmEstRQ) and then transmits it to TAM A2CC (22). After confirming the result value (Ret) of the ATM BCC response message (AtmEstRP) received from TAM A2CC (22), TAM VPC (21) executes the V5.2 bearer channel connection procedures (pd_V5BccConnRq) and transmits an allocation complete message (Allocation Comp) to LE (10), if the result value is 'OK', or transmits an allocation reject message (Allocation Reject) to LE (10), if the result value is 'NOK'.

When TAM VPC (21) receives the release message (DeAllocation) from LE (10), it confirms its own current state. Then, TAM VPC (21) transmits: (1) a release complete message (DeAllocation Comp) to LE (10), in the case of the BCC0 state (NULL); (2) transmits an error message (V52FailRP) to TAM A2CC (22) and transmits the release complete message (DeAllocation Comp) to LE (10), at the same time, in the case of the BCC1 state (Wait AtmEstRP); and (3) transmits an ATM BCC release request (AtmRelRQ) to TAM A2CC (22), in the case of the BCC2 state (Conversation).

Upon receiving an ATM BCC release response message (AtmRelRP) from TAM A2CC (22) and executing the V5.2 bearer channel release procedures (Pd_V5BccRelRq), TAM VPC (21) transmits the release complete message (DeAllocation Comp) to LE (10) only if the procedures have been ordinarily executed. If the result of the execution of the V5.2 bearer channel release procedures (Pd_V5BccRelRq) is 'NOK', TAM VPC (21) transmits a release reject message DeAllocation Reject) to LE (10).

TAM A2CC (22) receives the ATM BCC request message (AtmEstRQ) from TAM VPC (21) and confirms the subscriber's current state. Thereafter, TAM A2CC (22) transmits a bearer channel allocation request message (CidAllocRQ) to RAM A2CC (41), in the case of the idle state (IDLE). TAM A2CC (22): (1) executes the ATM resource connection procedures (pd_AtmRsrcConnRQ) and then transmits the ATM BCC response message (AtmEstRP) to TAM VPC (21), in the case of the originating busy state (O_BUSY); (2) sets the result value (Ret) of the ATM BCC response message (AtmEstRP) with 'NOK' and transmits it to TAM VPC (21), in the case of the originating suspend state (O_SUSPEND) or the terminating suspend state (T_SUSPEND); and (3) sets the result value (Ret) of the ATM BCC response message (AtmEstRP) with 'OK' and transmits it to TAM VPC (21), in the case of the terminating busy state (T_BUSY). Furthermore, TAM A2CC (22) receives the ATM BCC release request message (AtmRelRQ) from TAM VPC (21) and confirms the subscriber's current state. Thereafter, TAM A2CC (22): (1) transmits the ATM BCC release response message (AtmRelRP) to TAM VPC (21), in the case of the idle state (IDLE); and (2) executes the ATM resource release procedures (pd_AtmRsrcRelRQ) and then generates and transmits a bearer channel release request message (CidDeAllocRQ) to RAM A2CC (41), in the case of the originating busy state (O_BUSY), the originating suspend state (O_SUSPEND), the terminating busy state (T_BUSY) or the terminating suspend state (T_SUSPEND). Also, TAM A2CC (22) receives the error message (V52FailRP) from TAM VPC (21), executes the ATM resource release procedures (Pd_AtmRsrcRelRQ), and then transmits the bearer channel release request message (CidDeAllocRQ) to RAM A2CC (41). Additionally, TAM A2CC (22) confirms the result value (Ret) of the bearer channel allocation response message (CidAllocRP), received from the RAM A2CC (41). Thereafter, TAM A2CC (22): (1) sets the ATM BCC response message (AtmEstRP) with 'NOK,' in the case of 'NOK'; or (2) executes the ATM resource connection procedures (Pd_AtmRsrcConnRQ), includes the result value (Ret) of the execution in the ATM BCC response message (AtmEstRP), and transmits it to TAM VPC (21) in case of 'OK'. Furthermore, TAM A2CC (22) receives a bearer channel release response message (CidDeAllocRP) from RAM A2CC (41) and transmits the ATM BCC release response message (AtmRelRP) to TAM VPC (21).

RAM A2CC (41) receives the bearer channel allocation request message (CidAllocRQ) from TAM A2CC (22), executes a bearer channel connection in the ATM area, and then transmits the bearer channel allocation response message (CidAllocRP) to TAM A2CC (22). RAM A2CC (41) also receives the bearer channel release request message (CidDeAllocRQ) from TAM A2CC (22), executes the bearer channel release in the ATM area, and then transmits the bearer channel release response message (CidDeAllocRP) to TAM A2CC (22).

The FSM operating method for the BCC located between the V52 interface and the ATM interface, according to a preferred embodiment of the present invention, will be explained below with references to the state tables of FIGS. 3 and 4 and with reference to the flowchart of FIG. 5. FIG. 5 is flowchart illustrating the FSM operating method, for the BCC between the V5.2 interface and the ATM interface, according to a preferred embodiment of the present invention.

The step of allocating a bearer channel between the V5.2 interface and the ATM interface, depending on the states of TAM (20) and RAM (40) (i.e., the system's current state and the subscriber's current state), is as follows.

In A2CC (22) of TAM (20), a state transition is made according to the subscriber's state. If there is a hook off event (Hook Off) of the subscriber in the idle state (IDLE) or the originating suspend state (O_SUSPEND), the transition is made to the originating busy state (O_BUSY). If there is a hook off event (Hook Off) of the subscriber in the terminating suspend state (T_SUSPEND), the transition is made to the terminating busy state (T_BUSY). If there is a hook on event (Hook On) of the subscriber in the originating busy state (O_BUSY), the transition is made to the originating suspend state (O_SUSPEND). If there is a hook on event (Hook On) of the subscriber in the terminating busy state (T_BUSY), the transition is made to the terminating suspend state (T_SUSPEND).

When LE (10) generates an allocation message (Allocation), which is a V5.2 BCC protocol message requesting a BCC, and transmits the message to VPC (21) of TAM (20), TAM VPC (21) generates an ATM BCC request message (AtmEstRQ). AtmEstRQ is a signal message requesting a BCC in the ATM area while in a BCC0 state (NULL). TAM VPC (21) transmits AtmEstRQ to TAM A2CC (22), which is in charge of a BCC of the ATM area, and, thereafter, starts the operation of the timer (TA2Est) for timing a response to the connection request. Then, TAM VPC (21) makes a transition to the BCC1 state, which is the ATM BCC response message receipt waiting state (Wait AtmEstRP).

Subsequently, TAM A2CC (22) confirms the subscriber's current state. First, in the case that the subscriber's current state is the idle state (IDLE), if the ATM BCC request message (AtmEstRQ) is received from TAM VPC (21), TAM A2CC (22) generates a bearer channel allocation request message (CidAllocRQ). CidAllocRQ is a signal message requesting the connection to a relative station, of the ATM network, for a BCC of the ATM area. TAM A2CC (22) transmits CidAllocRQ to A2CC (41) of RAM (40) and then makes a transition to the terminating busy state (T_BUSY).

Second, in the case that the subscriber's current state is the originating busy state (O_BUSY), if the ATM BCC request message (AtmEstRQ) is received from TAM VPC (21), TAM A2CC (22) executes the ATM resource connection procedures (pd_AtmRsrcConnRQ), includes the result value (Ret) of such execution in an ATM BCC response message (AtmEstRP), which is a signal message notifying the result of the ATM area's BCC, and transmits the message to TAM VPC (21).

Third, in the case that the subscriber's current state is the originating suspend state (O_SUSPEND) or the terminating suspend state (T_SUSPEND), if the ATM BCC request message (AtmEstRQ) is received from TAM VPC (21), TAM A2CC (22) sets the result value (Ret) of the ATM BCC response message (AtmEstRP) with 'NOK' and transmits it to TAM VPC (21).

Fourth, in the case that the subscriber's current state is the terminating busy state (T_BUSY), if the ATM BCC request message (AtmEstRQ) is received from TAM VPC (21), TAM A2CC (22) sets the result value (Ret) of the ATM BCC response message (AtmEstRP) with 'OK' and transmits it to the TAM VPC (21).

Thereupon, RAM A2CC (41) receives the bearer channel allocation request message (CidAllocRQ) from TAM A2CC (22), generates a bearer channel allocation response message (CidAllocRP), which is a signal message notifying the result of the ATM area's BCC, and transmits the message to TAM A2CC (22). Specifically, RAM A2CC (41) executes the ATM area's BCC and, thereafter, includes the result value (Ret) of such execution in the bearer channel allocation response message (CidAllocRP) and transmits it to TAM A2CC (22).

Then, TAM A2CC (22) confirms the subscriber's current state. First, in the case that the subscriber's current state is the terminating busy state (T_BUSY), TAM A2CC (22) confirms the result value (Ret) of the bearer channel allocation response message (CidAllocRP), received from RAM A2CC (41). If the result value (Ret) is 'NOK', TAM A2CC (22) sets the result value (Ret) of the ATM BCC response message (AtmEstRP) with 'NOK' and then transmits the message to TAM VPC (21). On the other hand, if the result value (Ret) is 'OK', TAM A2CC (22) executes the ATM resource connection procedures (Pd_AtmRsrcConnRQ) and then includes the result value (Ret) of the execution in the ATM BCC response message (AtmEstRP) and transmits the message to TAM VPC (21).

Second, in the case that the subscriber's current state is the originating busy state (O_BUSY), the originating suspend state (O_SUSPEND), or the terminating suspend state (T_SUSPEND) and the result value (Ret) of the bearer channel allocation response message (CidAllocRP) received from RAM A2CC (41) is 'NOK,' TAM A2CC (22) sets the result value (Ret) of the ATM BCC response message (AtmEstRP) with 'NOK' and then transmits the message to the TAM VPC (21).

TAM VPC (21), while in the BCC1 state (Wait AtmEstRP), waits to receive the ATM BCC response message (AtmEstRP) from TAM A2CC (22). If the timer (TA2Est) expires, TAM VPC (21) transmits an error message (V52FailRP). V52FailRP is a signal message instructing TAM A2CC (22) to release the resource, so that the ATM area's bearer channel may be released for an abnormal reason. At the same time, TAM VPC (21) transmits to LE (10) the allocation reject message (Allocation Reject), which is a signal message indicating that the resource cannot be connected. Thereafter, TAM VPC (21) makes a state transition back to the BCC0 state NULL).

Then, TAM A2CC (22) confirms the subscriber's current state. First, in the case that the subscriber's current state is the originating suspend state (O_SUSPEND), the terminating busy state (T_BUSY), or the terminating suspend state (T_SUSPEND), if an error message (V52FailRP) is received from TAM VPC (21), TAM A2CC (22) executes the ATM resource release procedures (Pd_AtmRsrcRelRQ), generates a bearer channel release request message (CidDeAllocRQ), which is a signal message requesting the release to a relative station of the ATM network for the ATM area's bearer channel release, and transmits the message to RAM A2CC (41).

Second, in the case that the subscriber's current state is the originating busy state (O_BUSY), if an error message (V52FailRP) is received from TAM VPC (21), TAM A2CC (22) executes the ATM resource release procedures (Pd_AtmRsrcRelRQ), generates the bearer channel release request message (CidDeAllocRQ), and transmits (CidDeAllocRQ) to RAM A2CC (41). Thereafter, TAM A2CC (22) makes a transition to the originating suspend state (O_SUSPEND).

Then, RAM A2CC (41) receives the bearer channel release request message (CidDeAllocRQ) from TAM A2CC (22), executes the ATM area's bearer channel release, and then generates a bearer channel release response message (CidDeAllocRP), which is a signal message notifying the completion of the ATM area's bearer channel release. Then, TAM A2CC (22) transmits the message to TAM A2CC (22)

Thereupon, TAM A2CC (22) receives the bearer channel release response message (CidDeAllocRP) from RAM A2CC (41), transmits the ATM BCC release response message (AtmRelRP), which is a signal message notifying the ATM resource release to the TAM VPC (21) and, thereafter, makes a transition to the idle state (IDLE).

When TAM VPC (21) is in the BCC3 state (Wait AtmRelRP), which is a waiting state for receiving the ATM BCC release response message (AtmRelRP), it receives the ATM BCC release response message (AtmRelRP) from TAM A2CC (22) and executes the V5.2 bearer channel release procedures (Pd_V5BccRelRq). If the procedures have been ordinarily executed ('OK'), TAM VPC (21) stops the timer (TA2Rel) and transmits to LE (10) a release complete message (DeAllocation Comp) notifying LE (10) that the V5.2 bearer channel release has been completed ordinarily. Thereafter, TAM VPC (21) makes a transition to the BCC0 state NULL).

On the other hand, if the execution result of the V5.2 bearer channel release (Pd_V5BccRelRq) is 'NOK', TAM VPC (21) stops the timer (TA2Rel) and transmits to LE (10) a release reject message (DeAllocation Reject), rejecting the request for the V5.2 bearer channel release. Thereafter, TAM VPC (21) makes a transition to the BCC0 state NULL).

If TAM VPC (21) receives the ATM BCC response message (AtmEstRP) from TAM A2CC (22) while in the BCC1 state (Wait AtmEstRP), TAM VPC (21) confirms the result value (Ret) of the received ATM BCC response message (AtmEstRP). If the result value (Ret) is 'OK,' indicating the ordinary processing, TAM VPC (21) stops the timer (TA2Est) and executes the V5.2 bearer channel connection procedures (pd_V5BccConnRq). Thereafter, if the procedures have been executed ordinarily ('OK'), TAM VPC (21) transmits an allocation complete message (Allocation Comp) notifying LE (10) of the completion of the V5.2 BCC.

On the other hand, if the result value (Ret) of the ATM BCC response message (AtmEstRP) received from the TAM A2CC (22) is 'NOK' or if the execution result of the V5.2 bearer channel connection procedures (pd_V5BccConnRq) is 'NOK', TAM VPC (21) stops the timer (TA2Est) and transmits an allocation reject message (Allocation Reject), rejecting the request for the V5.2 bearer channel connection, notifying LE (10) that the bearer channel cannot be connected.

If TAM VPC (21) receives the ATM BCC response message (AtmEstRP) from TAM A2CC (22), while in the BCC0 state (NULL), TAM VPC (21) transmits the error message (V52FailRP) to TAM A2CC (22) so that the above-described operations may be conducted.

The step of releasing the bearer channel connected between the V5.2 interface and the ATM interface, depending on the states of TAM (20) and RAM (40) (i.e., the system's current state and the subscriber's current state), is as follows.

TAM A2CC (22) makes a state transition according to the subscriber's state. If there is a hook off event (Hook Off) of the subscriber during the idle state (IDLE) or the originating suspend state (O_SUSPEND), the transition is made to the originating busy state (O_BUSY). If there is a hook off event (Hook Off) of the subscriber in the terminating suspend state (T_SUSPEND), the transition is made to the terminating busy state (T_BUSY). If there is a hook on event (Hook On) of the subscriber in the originating busy state (O_BUSY), the transition is made to the originating suspend state (O_SUSPEND). If there is a hook on event (Hook On) of the subscriber in the terminating busy state (T_BUSY), the transition is made to the terminating suspend state (T_SUSPEND).

LE (10) generates a release message (DeAllocation), which is a V5.2 BCC protocol message requesting the bearer channel release, and transmits the message to TAM VPC (21). In response, TAM VPC (21) confirms its own state. First, in the case that TAM VPC's (21) current state is the BCC0 state (NULL) and the release message (DeAllocation) is received from LE (10), TAM VPC (21) transmits to LE (10) a release complete message (DeAllocation Comp), indicating the ordinary completion of the V5.2 bearer channel release.

Second, in the case that TAM VPC's (21) current state is the BCC1 state (Wait AtmEstRP) and the release message (DeAllocation) is received from LE (10), TAM VPC (21) stops the timer (TA2Est) and transmits the error message (V52FailRP) to TAM A2CC (22), instructing the bearer channel release again. In this manner, as TAM VPC (21) causes the above-described operations to be conducted again, it transmits the release complete message (DeAllocation Comp) to LE (10) at the same time. Then, TAM VPC (21) makes a state transition back to the BCC0 state (NULL).

Third, in the case that TAM VPC's (21) current state is the BCC2 state (Conversation) and the release message (DeAllocation) is received from LE (10), TAM VPC (21) generates an ATM BCC release request message (AtmRelRQ), which is a signal message requesting the ATM area's bearer channel release, and transmits it to TAM A2CC (22). Thereafter, TAM VPC (21) operates the timer (TA2Rel) to time a response to the release request and makes a transition to the BCC3 state (Wait AtmRelRP). BCC3 state is a state in which TAM VPC (21) waits for an ATM BCC release response message (AtmRelRP).

Then, TAM A2CC (22) confirms the subscriber's current state. First, in the case that the subscriber's current state is the idle state (IDLE) and the ATM BCC release request message (AtmRelRQ) is received from TAM VPC (21), TAM A2CC (22) transmits the ATM BCC release response message (AtmRelRP) to TAM VPC (21), indicating the completion of the ATM resource release.

Second, in the case that the subscriber's current state is the originating busy state (O_BUSY), the originating suspend state (O_SUSPEND), the terminating busy state (T_BUSY) or the terminating suspend state (T_SUSPEND) and the ATM BCC release request message (AtmRelRQ) is received from TAM VPC (21), TAM A2CC (22) executes the ATM resource release procedures (Pd_AtmRsrcRelRQ) and generates a bearer channel release request message (CidDeAllocRQ), which is a signal message requesting the ATM area's bearer channel release to a relative station of the ATM network. Then, TAM A2CC (22) transmits the message to RAM A2CC (41).

Thereupon, RAM A2CC (41) receives the bearer channel release request message (CidDeAllocRQ) from TAM A2CC (22), executes the ATM area's bearer channel release, generates a bearer channel release response message (CidDeAllocRP), which is a signal message notifying the completion of the ATM area's bearer channel release, and transmits (CidDeAllocRP) to TAM A2CC (22).

Then, TAM A2CC (22) receives the bearer channel release response message (CidDeAllocRP) from RAM A2CC (41), generates the ATM BCC release response message (AtmRelRP), transmits AtmRelRP to TAM VPC (21), and then makes a transition to the idle state (IDLE).

TAM VPC (21), while in the BCC3 state (Wait AtmRelRP), waits to receive the ATM BCC release response message (AtmRelRP) from TAM A2CC (22). Here, if the timer (TA2Rel) expires (Timer Expire), TAM VPC (21) executes the V5.2 bearer channel release procedures (Pd_V5BccRelRq). If the procedures have been executed ordinarily ('OK'), TAM VPC (21) transmits a release complete message (DeAllocation Comp) to LE (10). At the same time, TAM VPC (21) transmits an error message (V52FailRP) instructing TAM A2CC (22) to release the resource, so that the ATM area's bearer channel may be released for an ordinary reason. Thus, the above-described operations may be conducted. Thereafter, a transition to the BCC0 state (NULL) is made.

On the other hand, if the execution result of the V5.2 bearer channel release (Pd_V5BccRelRq) is 'NOK', TAM VPC (21) transmits a release reject message (DeAllocation Reject), rejecting the request for the V5.2 bearer channel release, to LE (10). At the same time, TAM VPC (21) transmits an error message (V52FailRP) instructing TAM A2CC (22) to release the resource, so that the ATM area's bearer channel may be released for an extraordinary reason. Thus, the above-described operations may be conducted. Thereafter, a transition to the BCC0 state (NULL) is made.

In the case that TAM VPC (21)'s state is the BCC3 state (Wait AtmRelRP) and TAM VPC (21) receives the ATM BCC release response message (AtmRelRP) from TAM A2CC (22), TAM VPC (21) executes the V5.2 bearer channel release procedures (Pd_V5BccRelRq). If the procedures have been executed ordinarily ('OK'), TAM VPC

(21) stops the timer (TA2Rel), transmits the release complete message (DeAllocation Comp), indicating the ordinary completion of the V5.2 bearer channel release, to LE (10) and, thereafter, makes a transition back to the BCC0 state NULL).

By contrast, if the execution result of the V5.2 bearer channel release procedures (Pd_V5BccRelRq) is 'NOK', TAM VPC (21) stops the timer (TA2Rel), transmits the release reject message (DeAllocation Reject), rejecting the request for the V5.2 bearer channel release, to LE (10) and, thereafter, makes a transition back to the BCC0 state NULL).

As explained above, the present invention, by providing an FSM and the operating method thereof for a BCC between a gateway inter-operating in the conventional LE through the V5.2 interface and an access gateway operated through the ATM network, enables interfacing between the V5.2 BCC protocol and the AAL2 and AAL5 signaling of the ATM area and reduces the resource waste by making the stable communication line connection and release possible in the inter-action with an LE requiting real-time processing. Furthermore, the present invention reduces the performance degradation occurring due to the resource allocation required for call connection and disconnection and essentially resolves the problems in resource recovery caused by state inconsistency in matching different interfaces.

Additionally, by guaranteeing the mutual inter-operability for the BCC between the V5.2 interface and the ATM interface, the present invention enables the V5.2 BCC protocol currently operated on the network of the prior art to be matched to the ATM network without any modification. Moreover, the conventional principle that the LE has control over a bearer channel connection and release continues to apply in the present invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A Finite State Machine (FSM) for a Bearer Channel Connection (BCC) between a V5.2 interface and an Asynchronous Transfer Mode (ATM) interface, comprising:
    a V5.2 Interface Control Process FSM (TAM) that connects and releases a V5.2 bearer channel by controlling the V5.2 interface between a Local Exchange (LE) and a gateway; and
    an ATM Interface Control Process FSM (RAM) that connects and releases an ATM bearer channel by controlling the ATM interface between the gateway and an access gateway.

2. The FSM of claim 1, wherein the RAM includes a RAM AAL2 Call Control (A2CC) that establishes the BCC for an ATM area according to a bearer channel allocation request message received from the TAM and then transmits a bearer channel allocation response message to the TAM, and executes the ATM area's BCC release according to a bearer channel release request message received from the TAM and then transmits a bearer channel release response message to the TAM.

3. A Finite State Machine (FSM) for a Bearer Channel Connection (BCC) between a V5.2 interface and an Asynchronous Transfer Mode (ATM) interface, comprising:
    a V5.2 Interface Control Process FSM (TAM), V5.2 Protocol Control (VPC) that transmits an ATM BCC request message or an ATM BCC release request message according to an allocation message or a release message received from a Local Exchange (LE), or transmits an error message if there is no response to a transmitted message within a prescribed time or if there is any system error, executes V5.2 BCC procedures upon receiving an ATM BCC response message, and executes V5.2 BCC release procedures upon receiving an ATM BCC release response message;
    a TAM AAL2 Call Control (A2CC) that transmits a bearer channel allocation request message according to the ATM BCC request message received from the TAM VPC, executes ATM resource release procedures according to the ATM BCC release request message or the error message received from the TAM VPC and then transmits a bearer channel release request message, executes ATM resource connection procedures upon receiving a bearer channel allocation response message and then transmits the ATM BCC response message to the TAM VPC, and transmits the ATM BCC release response message to the TAM VPC upon receiving a bearer channel release response message; and
    an ATM Interface Control Process FSM (RAM) A2CC that establishes the BCC of an ATM area according to the bearer channel allocation request message received from the TAM A2CC and then transmits the bearer channel allocation response message to the TAM A2CC, and executes the ATM area's BCC release according to the bearer channel release request message received from the TAM A2CC and then transmits the bearer channel release response message to the TAM A2CC.

4. A Finite State Machine (FSM) operating method for a Bearer Channel Connection (BCC) between a V5.2 interface and an Asynchronous Transfer Mode (ATM) interface, comprising:
    allocating a bearer channel between the V5.2 interface and the ATM interface according to states of a V5.2 Interface Control Process FSM (TAM) and an ATM Interface Control Process FSM (RAM); and
    releasing the bearer channel connected between the V5.2 interface and the ATM interface according to the states of the TAM and the RAM.

5. The FSM operating method of claim 4, wherein allocating the bearer channel further comprises executing the ATM resource connection procedures and then generating the ATM BCC response message and transmitting it to the VPC of the TAM, if the A2CC of the TAM receives the ATM BCC request message while the subscriber's current state is an originating busy state.

6. The FSM operating method of claim 4, wherein allocating the bearer channel further comprises setting the result value of the ATM BCC response message with 'NOK' and transmitting it to the VPC of the TAM, if the A2CC of the TAM receives the ATM BCC request message while the subscriber's current state is an originating suspend state or a terminating suspend state.

7. The FSM operating method of claim 4, wherein allocating the bearer channel further comprises setting the result value of the ATM BCC response message with 'OK' and transmitting it to the VPC of the TAM, if the A2CC of the TAM receives the ATM BCC request message while the subscriber's current state is the terminating busy state.

8. The FSM operating method of claim 4, wherein allocating the beater channel further comprises setting the result value of the ATM BCC response message with 'NOK' and transmitting it to the VPC of the TAM, if the A2CC of the TAM receives the bearer channel allocation response message while the subscriber's current state is an originating busy state, an originating suspend state, or a terminating suspend state.

9. The FSM operating method of claim 4, wherein allocating the bearer channel further comprises transmitting an error message to the A2CC of the TAM and transmitting an allocation-reject message to the LE at substantially the same time, and then making a transition of an system state to the initial state in the VPC of the TAM, if the timer expires during the ATM BCC response message receipt waiting state.

10. The FSM operating method of claim 4, wherein allocating the bearer channel further comprises stopping the timer and generating an allocation-reject message at substantially the same time in the VPC of the TAM, if the result value of the ATM BCC response message is 'NOK' or of an execution result of the V5.2 bearer channel connection procedures is 'NOK'.

11. The FSM operating method of claim 4, wherein allocating the bearer channel further comprises generating an error message and transmitting it to the A2CC of the TAM, if the VPC of the TAM receives the ATM BCC response message in an initial system state.

12. The FSM operating method of claim 4, wherein releasing the bearer channel comprises:
receiving a release message from a Local Exchange (LE), confirming a system state and, thereafter, generating an ATM BCC release request message and driving a timer at substantially the same time, and making a transition of the system state to an ATM BCC release response message receipt waiting state in a V5.2 Protocol Control (VPC) of the TAM;
receiving the ATM BCC release request message, confirming a subscriber's current state and, thereafter, executing ATM resource release procedures, and generating a bearer channel release request message in an AAL2 Call Control (A2CC) of the TAM;
receiving the bearer channel release request message, executing a bearer channel release of an ATM area and, thereafter, generating a bearer channel release response message in an A2CC of the RAM;
receiving the bearer channel release response message and then generating an ATM BCC release response message and making a transition of the subscriber's current state to an idle state at substantially the same time in the A2CC of the TAM; and
receiving the ATM BCC release response message and then executing V5.2 bearer channel release procedures and, thereafter, stopping the timer operation and transmitting a release-complete message to the LE at substantially the same time, and making a transition of the system state to an initial state in the VPC of the TAM.

13. The FSM operating method of claim 12, wherein releasing the bearer channel further comprises transmitting the release-complete message to the LE, if the VPC of the TAM receives the ATM BCC release response release message in the initial state.

14. The FSM operating method of claim 12, wherein releasing the bearer channel further comprises stopping the timer operation, transmitting an error message to the A2CC of the TAM and transmitting the release-complete message to the LE at substantially the same time and, thereafter, making a transition of the system state to the initial state, if the VPC of the TAM receives the ATM BCC release response message during the ATM BCC release response message receipt waiting state.

15. The FSM operating method of claim 12, wherein releasing the bearer channel further comprises transmitting the ATM BCC release response message to the VPC of the TAM, if the A2CC of the TAM receives the ATM BCC release request message while the subscriber's current state is the idle state.

16. The FSM operating method of claim 12, wherein releasing the bearer channel further comprises executing the V5.2 bearer channel release procedures and, thereafter, transmitting the release-complete message to the LE and transmitting an error message to the A2CC of the TAM at substantially the same time, and then making a transition of the system state to the initial state in the VPC of the TAM, if the timer expires during the ATM BCC release response message receipt waiting state.

17. The FSM operating method of claim 16, wherein releasing the bearer channel further comprises transmitting a release-reject message to the LE and transmitting an error message to the A2CC of the TAM at substantially the same time, and making a transition of the system state to the initial state in the VPC of the TAM, if an execution result of the V5.2 bearer channel release procedures is 'NOK'.

18. The FSM operating method of claim 12, wherein releasing the bearer channel further comprises stopping the timer's operation and transmitting a release-reject message to the LE at substantially the same time and, thereafter, making a transition of the system state to the initial state in the VPC of the TAM, if an execution result of the V5.2 bearer channel release procedures is 'NOK'.

19. The FSM operating method of claim 4, further comprising:
communicating, from a TAM V5.2 Protocol Control (VPC) module to a TAM AAL2 Call Control (A2CC) module, a message requesting allocation or release of the bearer channel in accordance with an allocation message or a release message, respectively, received from a Local Exchange (LE); and
communicating, from the TAM A2CC module to the RAM, a message requesting the allocation or release of the bearer channel at the RAM, in accordance with the bearer channel allocation message or bearer channel release message, respectively, received from the TAM VPC module.

20. The FSM operating method of claim 4, further comprising:
communicating, from the RAM to a TAM AAL2 Call Control (A2CC) module, a message acknowledging an allocation or release of the bearer channel at the RAM, in accordance with a message request for a bearer channel allocation or release, respectively, received from the TAM A2CC module; and
communicating, from the TAM A2CC module to a TAM V5.2 Protocol Control (VPC) module, a message acknowledging the allocation or release of the bearer channel in accordance with the allocation or release acknowledgment message, respectively, received from the RAM.

21. The FSM operating method of claim 19, further comprising:
communicating, from the RAM to the TAM A2CC module, a message acknowledging the allocation or release of the bearer channel at the RAM, in accordance with the message request for a bearer channel allocation or release, respectively; received from the TAM A2CC module; and communicating, from the TAM A2CC module to the TAM VPC module, a message acknowledging the allocation or release of the bearer channel in accordance with the allocation or release acknowledgment message, respectively, received from the RAM.

22. The FSM operating method of claim 21, further comprising:

executing V5.2 BCC establishment procedures with the TAM VPC module, upon receiving the allocation acknowledgment message from the TAM A2CC module; and executing V5.2 BCC release procedures with the TAM VPC module, upon receiving the release acknowledgment message from the TAM A2CC module.

23. The FSM operating method of claim 21, further comprising:

executing ATM resource connection procedures with the TAM A2CC module, upon receiving the allocation acknowledgment message from the RAM; and executing ATM resource release procedures with the TAM A2CC module, upon receiving the release acknowledgment message from the RAM.

* * * * *